(12) United States Patent
Raghupathi (10) Patent No.: US 12,164,523 B2
(45) Date of Patent: Dec. 10, 2024

(54) MEDIA ATTRIBUTE INFERENCE SERVICE IN DATA WAREHOUSE SYSTEM

(71) Applicant: SAP SE, Walldorf (DE)

(72) Inventor: Krishnan Raghupathi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/058,087

(22) Filed: Nov. 22, 2022

(65) Prior Publication Data

US 2024/0168959 A1    May 23, 2024

(51) Int. Cl.
*G06F 16/2455* (2019.01)
*G06F 16/28* (2019.01)

(52) U.S. Cl.
CPC .. *G06F 16/24568* (2019.01); *G06F 16/24552* (2019.01); *G06F 16/283* (2019.01)

(58) Field of Classification Search
CPC ......... G06F 16/24568; G06F 16/24552; G06F 16/283; G06F 16/254
USPC .................. 707/602, 722, 741, 755, 756, 811
See application file for complete search history.

(56) References Cited

U.S. PATENT DOCUMENTS

| | | | | |
|---|---|---|---|---|
| 10,311,076 B1 * | 6/2019 | Bruhn | ................... | G16H 10/60 |
| 11,854,675 B1 * | 12/2023 | Wittmershaus | ........ | G06N 3/084 |
| 11,915,807 B1 * | 2/2024 | Canfield | ................ | G16H 10/60 |
| 2005/0022238 A1 * | 1/2005 | Ardissono | .......... | H04N 21/4147 |
| | | | | 348/E7.056 |
| 2019/0236210 A1 * | 8/2019 | Makaremi | ............... | H04L 67/12 |
| 2019/0362841 A1 * | 11/2019 | Aysin | ....................... | G06N 3/08 |
| 2020/0089504 A1 * | 3/2020 | Al Sheikh | ............. | G06F 9/3844 |
| 2021/0264195 A1 * | 8/2021 | Ingram | ............... | G06F 16/5866 |
| 2021/0357188 A1 * | 11/2021 | Bayless | ................... | G06F 8/447 |
| 2022/0067420 A1 * | 3/2022 | Alatwah | ............... | G06V 20/00 |

* cited by examiner

*Primary Examiner* — Phong H Nguyen
(74) *Attorney, Agent, or Firm* — Fountainhead Law Group, PC (57) ABSTRACT

Embodiments store attributes extracted from incoming media data (e.g., image, audio, video), in a media store residing in a data lake together with other, non-media attributes. In response to incoming media data (e.g., an image), an engine references an unpopulated media attribute schema resulting from processing a trained deep learning model (e.g., a Convolutional Neural Network—CNN model). The engine applies the deep learning model to extract from the incoming media data, a media attribute (e.g., a cloudy spot dimension) comprising a prediction value and a confidence. The engine populates the media attribute schema with the attribute (value; confidence) and an identifier, and stores the populated media attribute schema in the data lake. The data lake also includes a non-media attribute (e.g., patient info) sharing the identifier. Now, the data lake may be queried for both the non-media (patient info) attribute and the media (image) attribute extracted by the model.

20 Claims, 7 Drawing Sheets

MEDIA ATTRIBUTE INFERENCE SERVICE IN DATA WAREHOUSE SYSTEM

BACKGROUND

Unless otherwise indicated herein, the approaches described in this section are not prior art to the claims in this application and are not admitted to be prior art by inclusion in this section.

There is an increasing need to store media assets (e.g., image, audio, video) in data warehouses (such as databases). Such media assets can take a wide variety of forms, including but not limited to X-ray images and CT scans (e.g., for the diagnosis and treatment of medical conditions), and satellite images (e.g., for reference in agribusiness applications).

The wealth of information present in such media assets, may be attempted to be leveraged using labor-intensive techniques that are expensive and involve discretion owing to the variable exercise of human judgment. Such manual approaches can be difficult and costly to implement in data warehouse systems that store large volumes of data.

SUMMARY

Embodiments relate to systems and methods allowing storage of attributes extracted from media data (e.g., image, audio, video), in a media store residing in a data lake together with other, non-media attributes. An attribute engine receives incoming media data (e.g., an x-ray image). The attribute engine references an unpopulated media attribute schema, that results from processing of a deep learning model (e.g., a Convolutional Neural Network—CNN model). The attribute engine applies the deep learning model to extract from the incoming media data, an attribute (e.g., a dimension of a cloudy spot in the x-ray) comprising a prediction value and a prediction confidence. The attribute engine populates the media attribute schema with the value, the confidence, and an identifier, and stores the populated media attribute schema in the data lake.

The data lake also includes a non-media attribute (e.g., patient age, gender) sharing the identifier. Accordingly, as a result of operation of the attribute engine, the data lake may now be intelligently queried for both the original non-media attribute (patient), as well as the media attribute (cloudy spot dimension) extracted by the model from incoming media data.

The following detailed description and accompanying drawings provide a better understanding of the nature and advantages of various embodiments.

DETAILED DESCRIPTION

Described herein are methods and apparatuses performing the inference of attributes to image assets. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
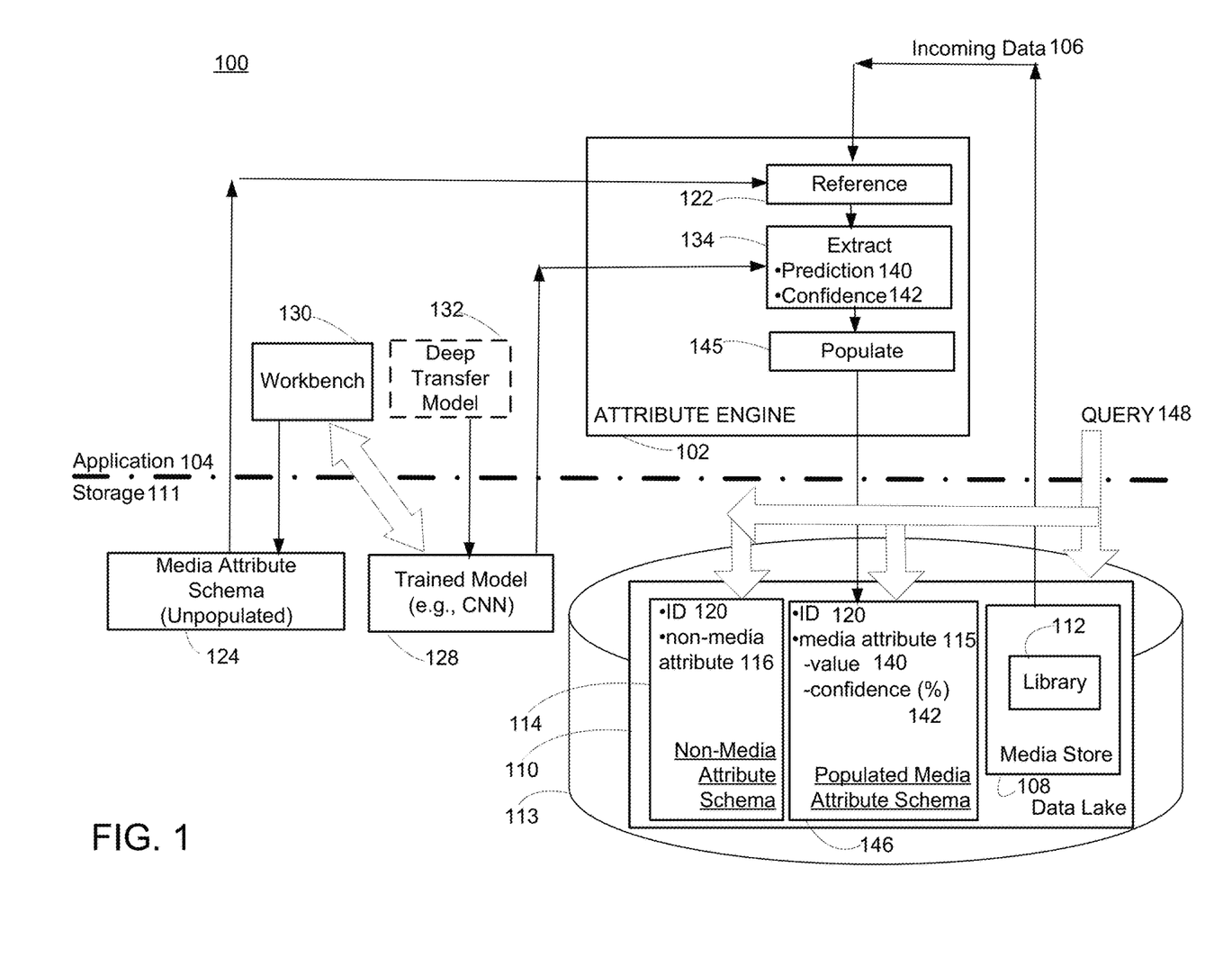
FIG. 1 shows a simplified diagram of a system according to an embodiment.

FIG. 1 shows a simplified view of a system that is configured to implement attribute inference according to an embodiment. The system 100 comprises an attribute engine 102 that is located in an application layer 104.

The attribute engine is configured to receive incoming media data 106, as may be located within a media store 108 of data lake 110 within non-transitory computer readable storage media 113 of storage layer 111. Examples of media data can include but are not limited to images, audio, and video. The media data of the media store may be organized according to one or more libraries 112.

Certain attributes may be present 115 within the incoming media data. In one possible example, the incoming media data could comprise an x-ray image. The attribute could be a dimension of a visual artifact (cloudy spot) that is present in the image.

The data lake already includes a non-media attribute schema 114 that is populated with non-media attributes 116. Continuing with the specific example just mentioned, such non-media attributes could comprise specific attributes (e.g., age, gender, others) of a particular radiology patient denoted by identifier 120.

It is desired to store the attributes of the incoming media data, in a manner that allows interaction with the non-media data. For example, it may be useful to formulate and pose a query containing both attributes of non-media data (e.g., patient specifics), as well has attributes of media data (e.g., a cloudy spot dimension).

Accordingly, in response to the incoming media data, the attribute engine is configured to reference 122 an unpopulated media attribute schema 124. This unpopulated media attribute schema can result from processing 126 of a trained machine learning model 128 (e.g., deep learning model) by a workbench 130.

One specific type of deep learning model that is particularly suited to process image media data, is a Convolutional Neural Network (CNN) model. In some embodiments, the trained model may be formed by fine tuning a deep transfer model 132 that has already been subject to pre-training.

Having referenced the specific media attribute schema for the trained model, the attribute engine then applies the model to extract non-media attributes from the incoming media data. Such non-media attributes can be characterized by a prediction value 140 together with a corresponding confidence 142 (e.g., expressed in a %) of that prediction. In some embodiments, the prediction value may be derived from a prediction vector.

Then, the attribute engine stores 144 the extracted attribute by filling in/populating 145 a media attribute schema 146. This schema population includes storing not only the prediction value and corresponding prediction confidence of the attribute, but also the identifier 120.

Now, as a result of operation of the attribute engine, the data lake includes not only attributes of the original non-media data (e.g., patient name, age) and the image data (the original x-ray), but also the attributes (e.g., cloudy spot dimension) that have been extracted from the incoming media data using the trained model. Assignment of the common ID between the non-media and media schema, allows querying 148 the data lake for both non-media and related media data.

Figure 2:
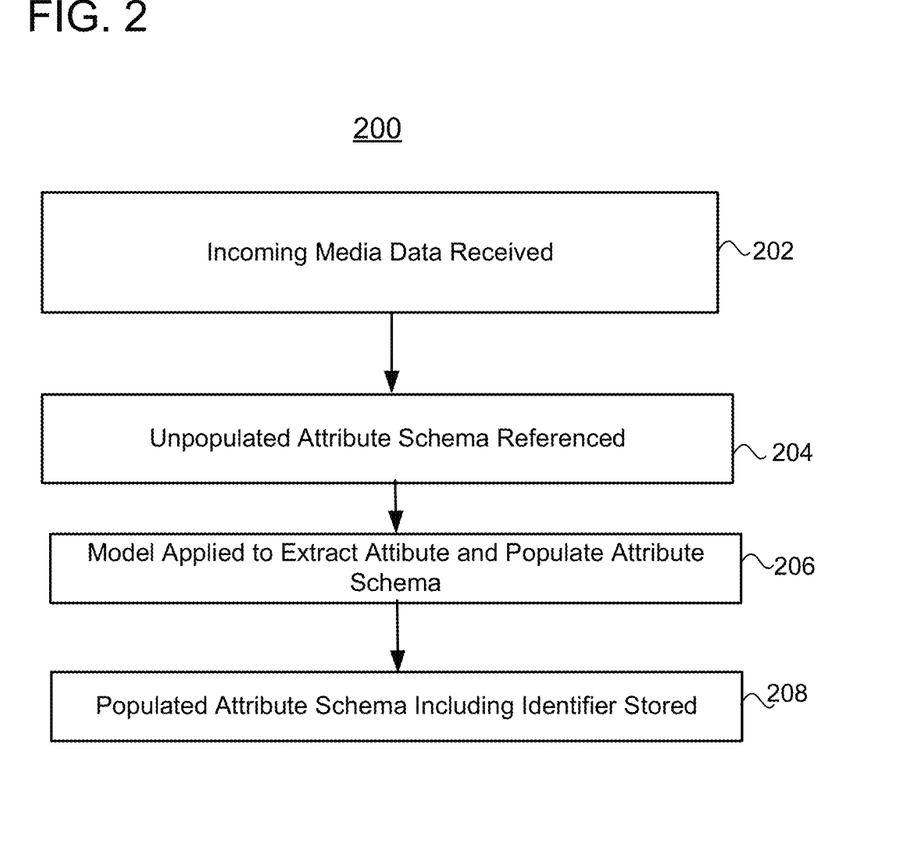
FIG. 2 shows a simplified flow diagram of a method according to an embodiment.

FIG. 2 is a flow diagram of a method 200 according to an embodiment. At 202, incoming media data is received.

In response to receiving the incoming media data, at 204 an unpopulated attribute schema is referenced, the unpopulated attribute schema resulting from processing of a trained deep learning model by a workbench.

At 206, the incoming media data is processed with the trained deep learning model to extract an attribute comprising a prediction value and a prediction confidence.

At 208 the attribute, the prediction value, the prediction confidence, and an identifier are stored in a populated attribute schema within a non-transitory computer readable storage medium, wherein the non-transitory computer readable storage medium comprises a non-media attribute also including the identifier.

Further details regarding the implementation data attribution according to various embodiments, are now provided in connection with the following example. This example utilizes multimedia data in the form of images, processed according to a deep learning model in the form of a deep transfer Convolutional Neural Network (CNN) model, pre-trained using the ImageNet repository.

Example

Figure 3:
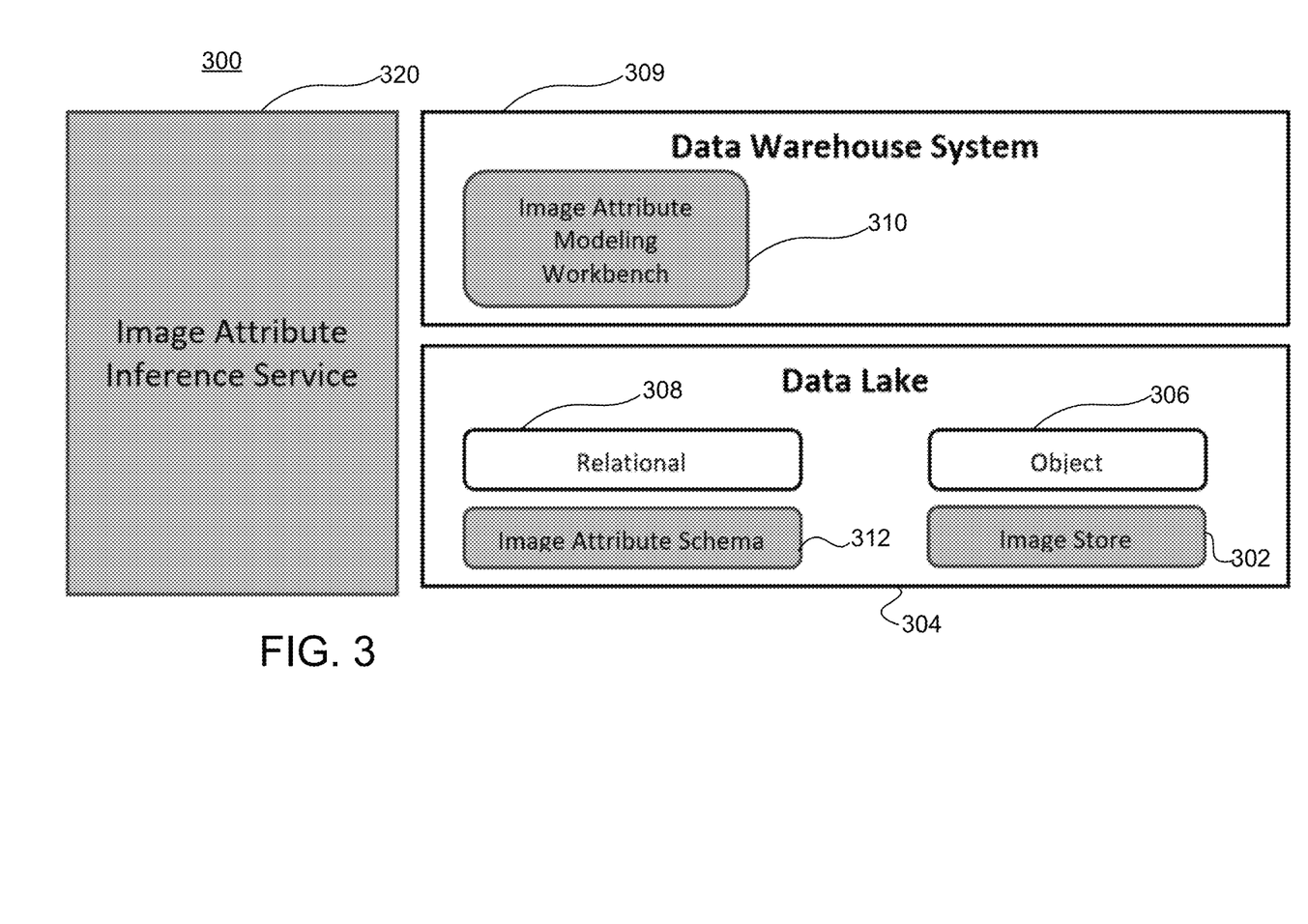
FIG. 3 shows an example architecture for implementing attribute inference in the context of incoming media data in the form of images.

This example enhances data warehousing systems with several additional features in order to implement image attribution. FIG. 3 is a simplified block diagram showing an architecture 300 according to the example.

In particular, the Image Store 302 is a lightweight and performant image storage system that supports the storage and retrieval of large volume of images. The image store is located within the Data Lake 304.

The Data Lake comprises data objects 306 that may exhibit a complex structure. In the Data Lake, the data objects may be linked to one another through a relational structure 308 (e.g., a relational database).

The image store component offers one or more of the following capabilities:
storage and retrieval of high-resolution images;
key-based association of images with rows and/or columns in relational tables;
ability to create image libraries based on user-defined categories.

The Image Attribute Modeling Workbench (IAMW) 310 is a machine learning based framework located within Data Warehouse 309. The IAMW allows the development, training, and deployment of Convolutional Neural Network (CNN) models.

Such models are designed to detect user-defined attributes from various image-based assets. The models may be deep transfer models, that have already been trained.

The IAMW is configured to support one or more of the following capabilities:
allow end users to define and maintain image attribute schemas consisting of derived attributes that are relevant for their business;
associate an image attribute schema with an image library; and
support use of pre-trained CNN models (deep transfer models) to develop/train/deploy models to detect the attributes as defined in the image attribute schema, that is associated with a given image library.

Figure 4:
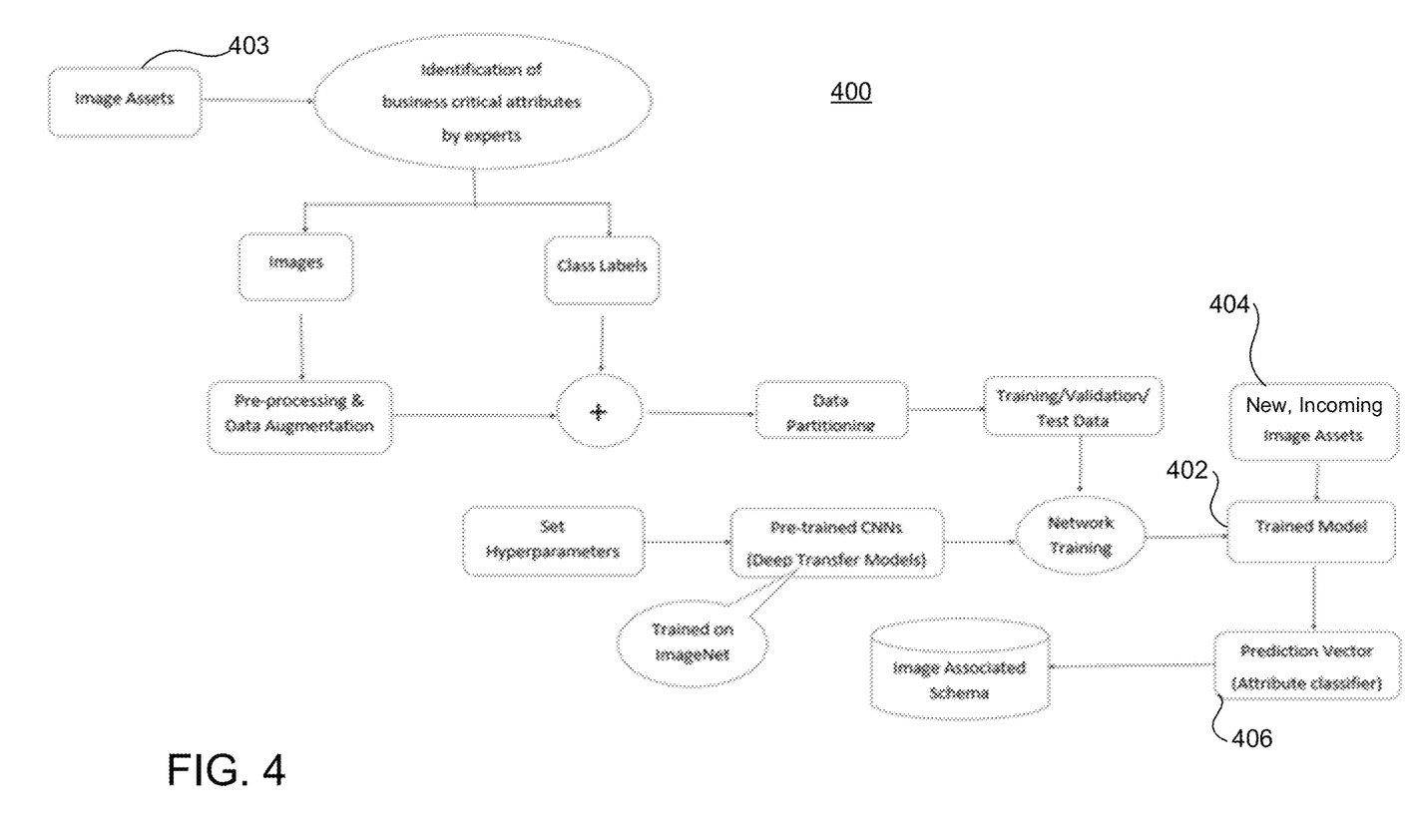
FIG. 4 is a focused view of a portion of the architecture of the example.

The schematic diagram of FIG. 4 depicts a flow 400 that may be implemented. Here a CNN model 402 trained with image assets 403, is used to process new incoming image assets 404 in order to result in a prediction vector 406.

The architecture of FIG. 3 also shows the Image Attribute Schema (IAS) 312. This is a user-defined attribute schema associated with a collection of images as defined during the modeling process performed within the IAMW. An image attribute schema is a collection of user-defined attributes.

That collection of user-defined attributes may exhibit the following characteristics.
An image attribute schema is associated with a uniquely defined image library
Each User-Defined Attribute (UDA) represents an array of UDA tuples
A UDA tuple comprises:
a) value of the attribute in an image as predicted by the model; and
b) confidence (e.g., %) associated with the prediction.

The exemplary architecture of FIG. 3 also shows an Image Attribute Inference Service (IAIS) 320. This is a run-time service that uses the CNN models deployed via the IAMW, to infer attributes predicted from newly created image-based assets, and populate the Image Attribute Schema associated with a collection of images.

Figure 5:
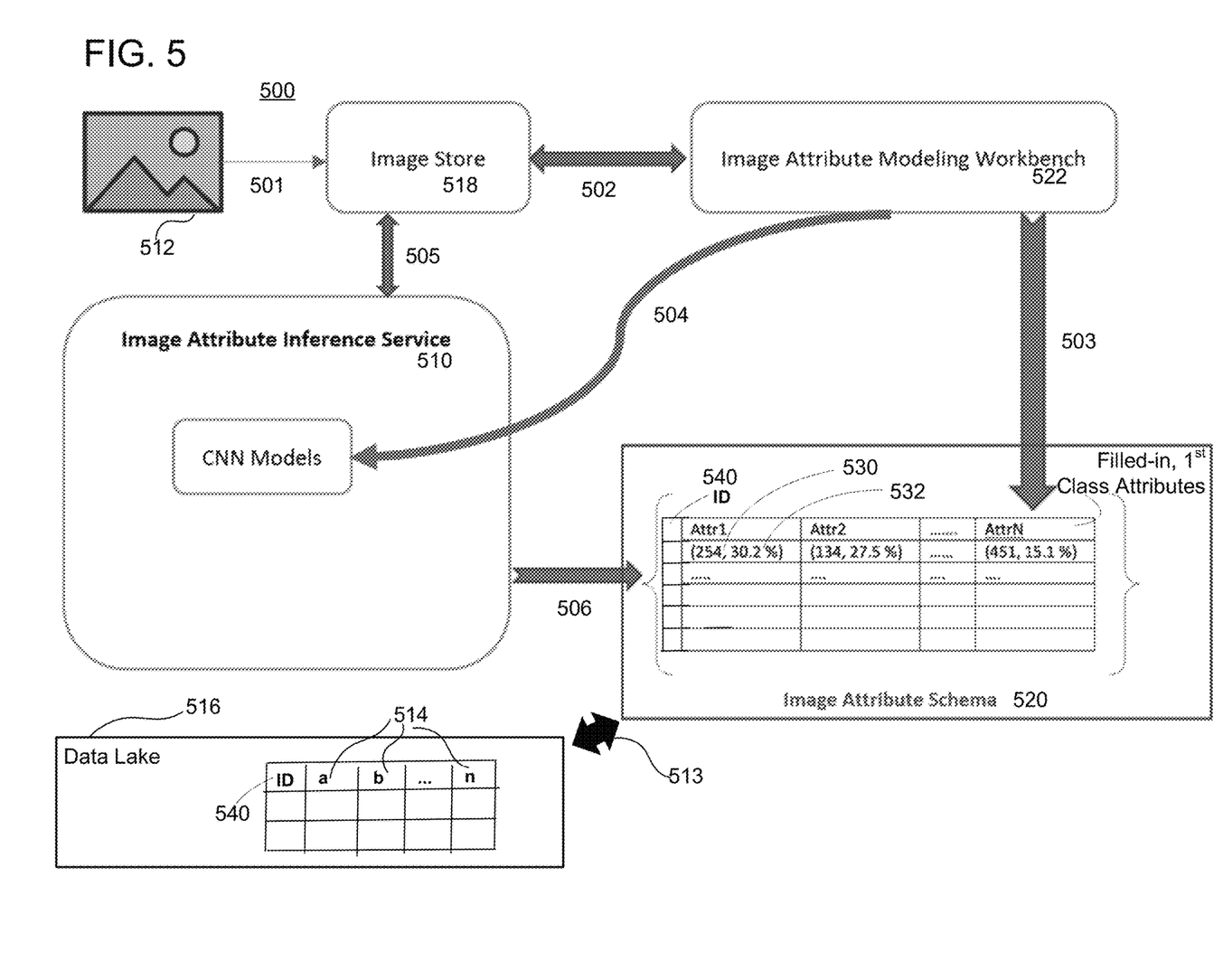
FIG. 5 is a simplified flow diagram of image attribution according to an embodiment.

FIG. 5 shows a simplified diagram of a flow 500 illustrating operation of the IAIS according to this example. Here, the IAIS 510 is the core run-time engine that transforms newly incoming images 512 into relevant, analysis-ready attributes that can be treated as first-class data warehousing attributes.

Using an assigned identifier 540, these image attributes can be combined 513 with other non-image attributes 514 in order to construct integrated and enriched data lakes 516. The engine performs this transformation by interacting with the image store 518, the image attribute schema 520, and the image attribute modeling workbench 522.

Details regarding the activities performed by the engine in FIG. 5, are now provided. First, at 501 high-resolution images are stored in the image store in the form of named image libraries.

Second, at 502 end users employ the Image Attribute Modeling Workbench to access the named image libraries.

At 503, the Image Attribute Modeling Workbench creates user-defined Image Attribute Schemas. These correspond to named image libraries that determine the attributes that should be extracted by the CNN models from the new incoming images.

At 504, the Image Attribute Modeling Workbench generates trained CNN models. These trained models are designed to predict the attributes as defined in the Image Attribute Schema. The attributes are then deployed within the context of the Image Attribute Inference Service.

Fifth, at 505 the Image Attribute Inference Service accesses new incoming images as they arrive in the image store. These new images are prepared for attribute extraction.

Sixth, at 506 the Image Attribute Inference Service uses the trained CNN models to extract the attributes from the new images. The Image Attribute Inference Service then fills in the corresponding Image Attribute Schema with the predicted attribute values 530 (e.g., from a prediction vector), together with their confidence percentages 532.

The predicted attribute values and confidence percentages are stored. Hence, via reference to the common, assigned identifier 540, these image attributes are available for specific querying and analysis in combination with other (non-image) attributes.

Turning now to illustrate practical implementations, one possible reference use case for image attribution according to embodiments could be in the medical domain. Consider the treatment of patients suffering from chronic obstructive pulmonary disease (COPD).

In COPD, patients develop abnormalities in their lungs. These abnormalities manifest in the form of lesions evident in chest Computed Tomography (CT) scans.

During treatment, doctors refer to periodic chest CT scans of patients in order to check whether the patient is responding to treatment. Image attribute inference according to embodiments could beneficially be deployed in a specialty hospital dealing primarily with diseases of the lung.

Given the global shortage of highly trained medical experts, who are qualified to interpret and analyze the CT scans, the medical staff may be overloaded with the volume of patients, impacting the time to diagnose a patient's condition and the subsequent course of treatment.

By employing image attribution inference according to embodiments, it would be possible to develop and deploy a trained CNN model to estimate average size of a lesion in a patient's CT scan with a high degree of accuracy. The image attribute schema filled-in by the Image Attribute Inference Service based on CT scans taken over several weeks, can then be combined in the data warehouse with other patient related non-image attributes (e.g., age, smoker?, gender, family history, many others).

This allows for the creation of an integrated view of the patient. This integrated view can then be used as an input to a real-time dashboard used by doctors and other medical staff to track the average size of a lesion in a patient's lungs over time.

Below is a list of useful attributes that could be extracted from image-based assets according to this exemplary embodiment.

The no. of lesions that appear in an X-ray image of the chest

Average size of lesions that appear in an X-ray image of the chest

Embodiments may offer one or more benefits. One possible benefit is the ability to leverage available information. In particular, images may already be available, and the application of image attribute inference can mine that data to discover valuable insights.

Another potential benefit is to enhance visibility and usefulness of the image data.

Embodiments can allow user-defined attributes derived from images, to be treated as first-class attributes in data warehousing systems. This can lead to the creation of more integrated and valuable dashboards.

Another potential benefit offered by embodiments is promote consistency. Rather than relying upon manual analysis that may vary from individual to individual, embodiments promote an objective classification of an organization's image-based assets.

Still another potential benefit of embodiments is reduced effort. The labor intensive effort of scanning and analyzing large volumes of image assets can be automated and combined with the application of advanced ML approaches to yield accurate results trained with large volume data corpuses.

Returning now to FIG. 1, there the particular embodiment is depicted with the attribute engine as being located outside of the database. However, this is not required.

Rather, alternative embodiments could leverage the processing power of an in-memory database engine (e.g., the in-memory database engine of the HANA in-memory database available from SAP SE), in order to perform various functions as described above, including but not limited to one or more of:

storing the incoming media data (e.g., in a library);
applying the model to the incoming media data to extract the prediction and confidence;
assigning the identifier;
populating the attribute schema;
processing the model to create the unpopulated attribute schema;
training the model;
pre-training the model; and
executing a query upon at least the populated media attribute schema.

Figure 6:
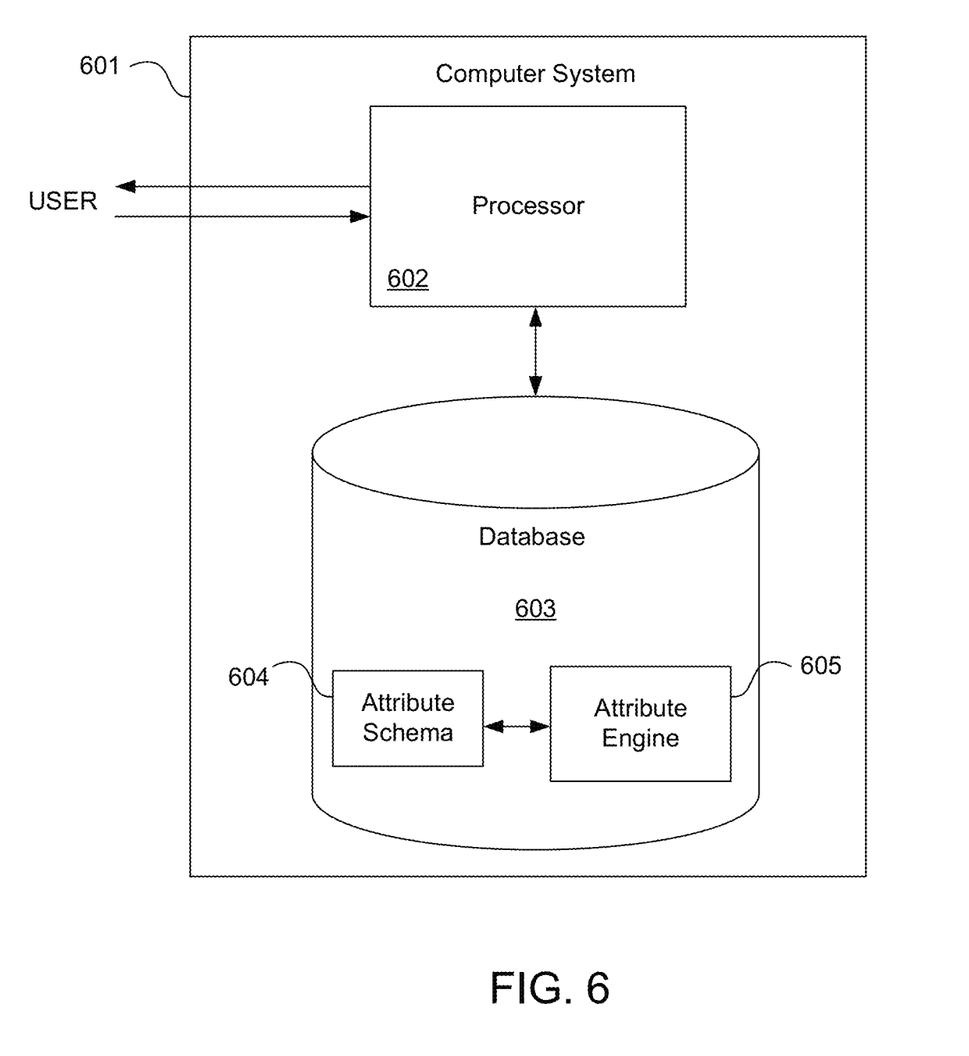
FIG. 6 illustrates hardware of a special purpose computing machine configured to implement attribute inference to an embodiment.

FIG. 6 illustrates hardware of a special purpose computing machine configured to implement image attribution according to an embodiment. In particular, computer system 601 comprises a processor 602 that is in electronic communication with a non-transitory computer-readable storage medium comprising a database 603. This computer-readable storage medium has stored thereon code 605 corresponding to an attribute engine. Code 604 corresponds to an attribute schema. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
  receiving incoming media data;
  in response to receiving the incoming media data, referencing an unpopulated attribute schema resulting from processing of a trained deep learning model by a workbench;
  processing the incoming media data with the trained deep learning model to extract an attribute comprising a prediction value and a prediction confidence; and
  storing the attribute, the prediction value, the prediction confidence, and an identifier in a filled in attribute schema within a non-transitory computer readable storage medium, wherein the non-transitory computer readable storage medium comprises a non-media attribute including the identifier.

Example 2. The computer implemented system and method of Example 1 wherein the prediction value is derived from a vector.

Example 3. The computer implemented system and method of Examples 1 or 2 wherein the confidence is a percentage.

Example 4. The computer implemented system and method of Examples 1, 2, or 3 wherein the incoming media data comprises image, audio, or video.

Example 7. The computer implemented system and method of Example 1, 2, 3, 4, 5, or 6 wherein the trained deep learning model is a Convolutional Neural Network (CNN).

Example 5. The computer implemented system and method of Examples 1, 2, 3, or 4 wherein the trained deep learning model is a pre-trained deep transfer model.

Example 6. The computer implemented system and method of Example 5 wherein: the incoming media data comprises an image; and the pre-trained deep transfer model is a Convolutional Neural Network (CNN).

Example 7. The computer implemented system and method of Example 6 wherein the Convolutional Neural Network is pre-trained using ImageNet.

Example 8. The computer implemented system and method of Examples 1, 2, 3, 4, 5, 6, or 7 wherein:
the non-transitory computer readable storage medium comprises an in-memory database; and
an in-memory database engine of the in-memory database executes a query upon the incoming media data in the in-memory database.

Figure 7:
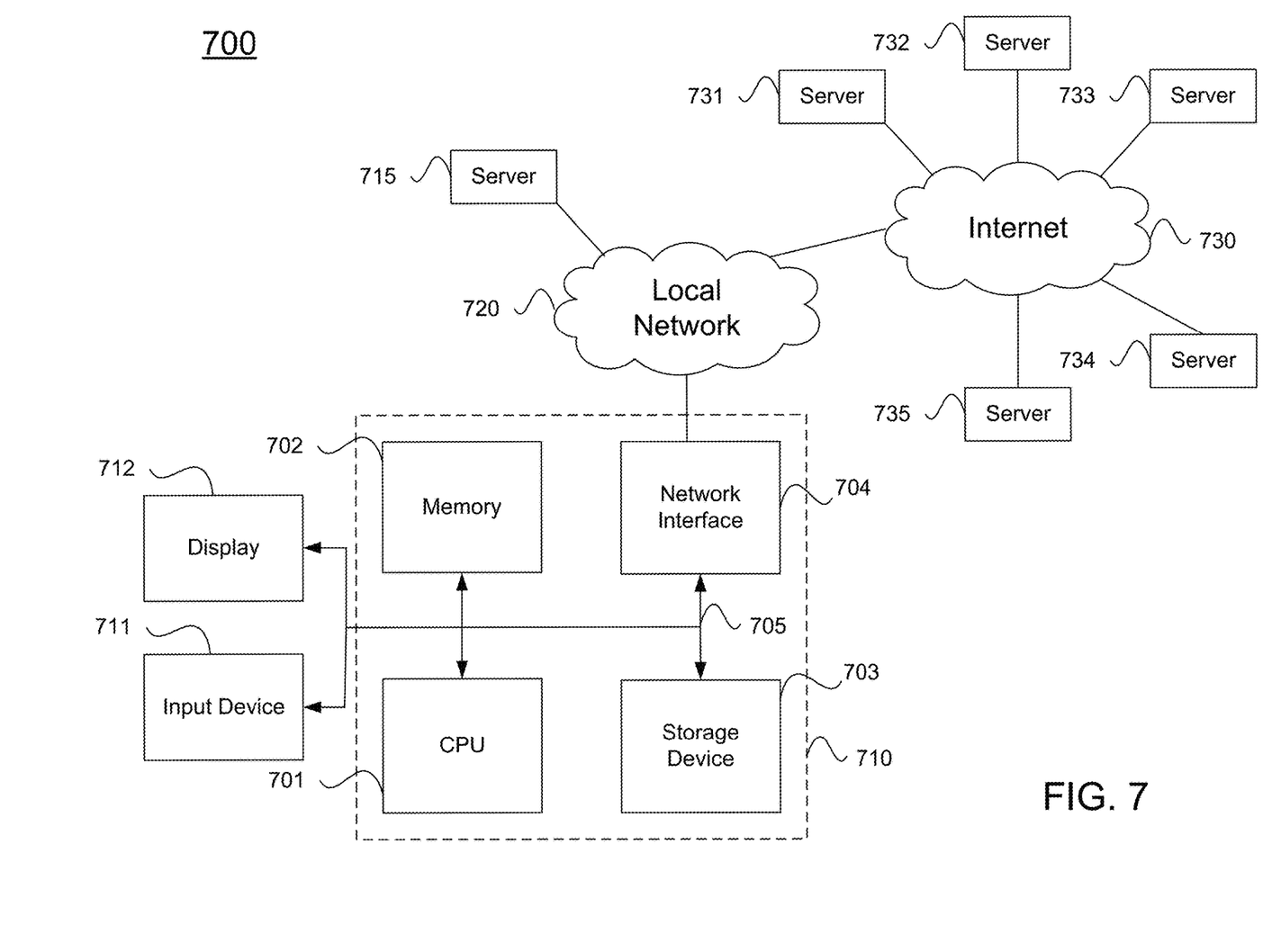
FIG. 7 illustrates an example computer system.

An example computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a Light Emitting Diode (LED) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 810 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving, from a user, an attribute schema associated with media data incoming to a data lake,
wherein the attribute schema initially defines a plurality of user-defined attributes to be associated with the media data in the data lake;
accessing a first portion of the media data;
in response to accessing the first portion of the media data, referencing a trained deep learning model configured to extract the plurality of user-defined attributes from the first portion of the media data;
applying the trained deep learning model to the first portion of the media data;
in response to applying the trained deep learning model, outputting, by the trained deep learning model, a plurality of prediction values for the first portion of the media data, each of the plurality of prediction values indicating that a particular attribute of the plurality of user-defined attributes is associated with the first portion of the media data, wherein each of the plurality of prediction values is associated with a prediction confidence;
populating the attribute schema with each of the plurality of prediction values and associated prediction confidence; and
storing the attribute schema within the data lake,
wherein the data lake comprises a non-media attribute schema corresponding to non-media data in the data lake, wherein the non-media attribute schema comprises an identifier associated with one or more non-media attributes of the non-media data, and wherein the identifier is stored in the attribute schema to link the attribute schema to the non-media attribute schema, and in accordance therewith, associate the one or more non-media attributes of the non-media data and the first portion of the media data in the data lake.

2. A method as in claim 1 wherein the trained deep learning model is a Convolutional Neural Network (CNN) model.

3. A method as in claim 1 wherein the incoming media data comprises an image.

4. A method as in claim 1 wherein the incoming media data comprises audio and/or video.

5. A method as in claim 1 wherein the trained deep learning model is a pre-trained deep transfer model.

6. A method as in claim 5 wherein:
the incoming media data comprises an image; and
the pre-trained deep transfer model is a Convolutional Neural Network (CNN) that is pre-trained using ImageNet.

7. A method as in claim 1 wherein the confidence is a percentage.

8. A method as in claim 1 wherein the prediction value is derived from a vector.

9. A method as in claim 1 wherein:
the non-transitory computer readable storage medium comprises an in-memory database; and
an in-memory database engine of the in-memory database executes a query upon the incoming media data in the in-memory database.

10. A non-transitory computer readable storage medium embodying a computer program for performing a method, said method comprising:
receiving, from a user, an attribute schema associated with media data incoming to a data lake,
wherein the attribute schema initially defines a plurality of user-defined attributes to be associated with the media data in the data lake;
accessing a first portion of the media data;
in response to accessing the first portion of the media data, referencing a trained deep learning model configured to extract the plurality of user-defined attributes from the first portion of the media data;
applying the trained deep learning model to the first portion of the media data;
in response to applying the trained deep learning model, outputting, by the trained deep learning model, a plurality of prediction values for the first portion of the media data, each of the plurality of prediction values indicating that a particular attribute of the plurality of user-defined attributes is associated with the first portion of the media data, wherein each of the plurality of prediction values is associated with a prediction confidence;
populating the attribute schema with each of the plurality of prediction values and associated prediction confidence; and
storing the attribute schema within the data lake,
wherein the data lake comprises a non-media attribute schema corresponding to non-media data in the data lake, wherein the non-media attribute schema comprises an identifier associated with one or more non-media attributes of the non-media data, and wherein the identifier is stored in the attribute schema to link the attribute schema to the non-media attribute schema, and in accordance therewith, associate the one or more non-media attributes of the non-media data and the first portion of the media data in the data lake.

11. A non-transitory computer readable storage medium as in claim 10 wherein the trained deep learning model comprises a Convolutional Neural Network Model.

12. A non-transitory computer readable storage medium as in claim 11 wherein the Convolutional Neural Network Model comprises a pre-trained deep transfer model.

13. A non-transitory computer readable storage medium as in claim 12 wherein the pre-trained deep transfer model is pre-trained using ImageNet.

14. A non-transitory computer readable storage medium as in claim 10 wherein the prediction value and the prediction confidence are stored as a tuple.

15. A computer system comprising:
one or more processors;
a software program, executable on said computer system, the software program configured to cause an in-memory database engine of an in-memory database to:
receive, from a user, an attribute schema associated with media data incoming to a data lake,
wherein the attribute schema initially defines a plurality of user-defined attributes to be associated with the media data in the data lake;
access a first portion of the media data;
in response to accessing the first portion of the media data, referencing a trained deep learning model configured to extract the plurality of user-defined attributes from the first portion of the media data;
apply the trained deep learning model to the first portion of the media data;
in response to applying the trained deep learning model, outputting, by the trained deep learning model, a plurality of prediction values for the first portion of the media data, each of the plurality of prediction values indicating that a particular attribute of the plurality of user-defined attributes is associated with the first portion of the media data, wherein each of the plurality of prediction values is associated with a prediction confidence;
populate the attribute schema with each of the plurality of prediction values and associated prediction confidence; and
store the attribute schema within the data lake,
wherein the data lake comprises a non-media attribute schema corresponding to non-media data in the data lake, wherein the non-media attribute schema comprises an identifier associated with one or more non-media attributes of the non-media data, and wherein the identifier is stored in the attribute schema to link the attribute schema to the non-media attribute schema, and in accordance therewith, associate the one or more non-media attributes of the non-media data and the first portion of the media data in the data lake.

16. A computer system as in claim 15 further comprising the in-memory database engine:
receiving a query;
executing the query upon the in-memory database; and
returning a query result including both the attribute and the non-media attribute.

17. A computer system as in claim 16 wherein:
the in-memory database further comprises the incoming media data; and
the query result further comprises the incoming media data.

18. A computer system as in claim 15 wherein the incoming media data comprises an image.

19. A computer system as in claim 15 wherein the incoming media data comprises audio and/or video.

20. A computer system as in claim 19 wherein the trained deep learning model is a Convolutional Neural Network (CNN) model.

* * * * *